(12) United States Patent
Suzuki et al.

(10) Patent No.: US 10,368,568 B2
(45) Date of Patent: Aug. 6, 2019

(54) METHOD AND APPARATUS FOR THE MANUFACTURE OF CRAB STICK

(71) Applicant: Eiyoh Korea Co., Ltd., Gyeongsangnam-do (KR)

(72) Inventors: Takanobu Suzuki, Iwaki (JP); Chae Man Kang, Haeundae-gu (KR)

(73) Assignee: EIYOH KOREA CO., LTD., Gyeongsangnam-do (KR)

( * ) Notice: Subject to any disclaimer, the term of this patent is extended or adjusted under 35 U.S.C. 154(b) by 19 days.

(21) Appl. No.: 14/694,636

(22) Filed: Apr. 23, 2015

(65) Prior Publication Data

US 2015/0305391 A1   Oct. 29, 2015

(30) Foreign Application Priority Data

Apr. 25, 2014   (KR) ........................ 10-2014-0049724

(51) Int. Cl.
| | |
|---|---|
| *A23L 17/00* | (2016.01) |
| *A22C 29/02* | (2006.01) |
| *A23P 20/00* | (2016.01) |
| *B65D 65/10* | (2006.01) |

(52) U.S. Cl.
CPC .............. *A23L 17/70* (2016.08); *A22C 29/02* (2013.01); *A23L 17/75* (2016.08); *A23P 20/00* (2016.08); *A23V 2002/00* (2013.01); *B65D 65/10* (2013.01)

(58) Field of Classification Search
CPC ..... A23L 1/3257; A23L 1/3255; A22C 29/02; A22C 25/00; A23P 1/08
See application file for complete search history.

(56) References Cited

U.S. PATENT DOCUMENTS 5,145,701 A * 9/1992 Sugino ...................... A23L 1/33
426/249

FOREIGN PATENT DOCUMENTS

| | | |
|---|---|---|
| JP | 2003009822 A | 1/2003 |
| KR | 960005059 B1 | 4/1996 |
| KR | 20020043859 A | 6/2002 |

OTHER PUBLICATIONS

English abstract JP 58-101665.*

* cited by examiner

*Primary Examiner* — Elizabeth Gwartney
(74) *Attorney, Agent, or Firm* — Pepper Hamilton LLP (57) ABSTRACT

Disclosed herein are a method and an apparatus for manufacturing a crab stick capable of saving costs accompanied by peeling off a film in businesses consuming a huge amount of crab sticks and reducing a generation of waste film providing a cause of environmental pollution by passing through and horizontally arranging plural strings of binding meats, which are wound in a bar shape, at a predetermined interval and covering upper and lower portions of the binding meats with a film and then packaging the covered binding meats by heat sealing.

3 Claims, 9 Drawing Sheets

FIG. 10

METHOD AND APPARATUS FOR THE MANUFACTURE OF CRAB STICK

CLAIM OF PRIORITY

This application is a U.S. national filing under 35 U.S.C. § 119(a) that claims priority to and the benefit of Republic of Korea Application No. 10-2014-0049724 filed on Apr. 25, 2014 and entitled "Method and Apparatus for the Manufacture of Crab Stick," the disclosure of which is incorporated herein by reference in its entirety and for all purposes.

BACKGROUND OF THE INVENTION

Field of the Invention

The present invention relates to a method and an apparatus for manufacturing a bundle of crab sticks, and more particularly, a method and an apparatus for manufacturing a bundle of crab sticks capable of saving costs accompanied by peeling off a film in businesses consuming a huge amount of crab sticks and reducing a generation of waste film providing a cause of environmental pollution by passing through and horizontally arranging plural strings of binding meats, which are wound in a bar shape, at a predetermined interval and covering upper and lower portions of the binding meats with a film and then packaging the covered binding meats by heat sealing.

Description of the Related Art

Generally, a crab stick contains aroma and taste which may be felt in a sea crab by mixing crab aroma with fish meat pastes such as soft and tender fish and processing the mixture. In particular, the crab stick is fish meat products which have been prevalently used as a child's taste, various foods, relishes, and the like.

Figure 1:
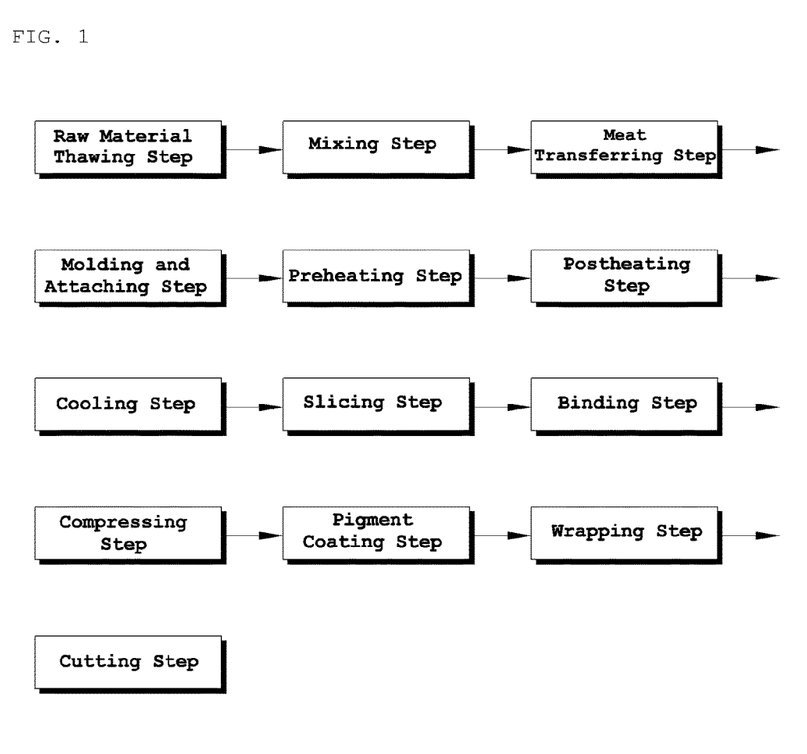
FIG. 1 is a diagram illustrating a process for manufacturing a bundle of crab sticks according to the related art.

As illustrated in FIG. 1, the existing method for manufacturing a bundle of crab sticks comprises: a thawing step of thawing a frozen (no more than −18° C.) raw material to make a temperature of a central portion of the frozen raw material reach about −3° C. so as to make the frozen raw material be in a suitable state for a subsequent mixing step; a mixing step of mixing, by a mixer, auxiliary materials while mixing raw materials to which the thawed raw material and various kinds of auxiliary raw materials are added; a meat transferring step of transferring, by a transfer pump, a mixed meat to a subsequent molding step; a molding and attaching step of peeling off, molding, and attaching, by a molding nozzle of a molding machine, the transferred mixed meat to have a predetermined thickness and width on a belt of a steel material; a preheating step of injecting steam into the peeled off and molded meat attached on the belt of the steel material and protein molding the peeled off and molded meat, into which the steam is injected, by heat; a postheating step of adjusting moisture of a surface of the preheated peeled off and molded meat to proper moisture by heat from a gas burner; a cooling step of cooling the peeled off meat, which is heated by steam and gas, in the air by cooling or forced ventilation; a slicing step of slicing, by a slicing machine, the cooled peeled off meat as a crab's leg flesh at an interval of about 1 mm; a binding step of rolling and binding, by a binding machine, the sliced peeled off meat in a bar shape; a compressing step of compressing, by a pressure roller, the binding meat; a pigment coating step of thinly coating, by a pigment coating machine, a pigment mixing meat on an inner film; a wrapping step of wrapping and sealing, by a wrapping machine, the pigment coated binding meat by the inner film; and a cutting step of cutting, by a cutter, the pigment coated binding meat which is wrapped and sealed by the inner film at a predetermined length.

However, since each of the crab sticks manufactured by the existing method for manufacturing a crab stick is wrapped and sealed by one sheet of inner film during the wrapping step, general consumers who consume a small amount of crab stick may use the crab sticks without great inconvenience when they peel off the inner film to use the crab sticks, but businesses such as food service facilities, gimbap chain stores, and food factories which consume a huge amount of crab sticks may lead to an increase in costs and a reduction in workability due to excessive labor and time waste and may lead to environmental pollution due to the occurrence of a large amount of waste film.

RELATED ART DOCUMENT

[Patent Document]
(Patent Document 1) Korean Patent Laid-Open Publication No. 1996-0005059 (Published on Apr. 20, 1996)

SUMMARY OF THE INVENTION

The present invention is directed to a method and an apparatus for manufacturing a bundle of crab sticks capable of saving costs accompanied by peeling off a film in businesses consuming a huge amount of crab sticks and reducing a generation of waste film providing a cause of environmental pollution by passing through and horizontally arranging plural strings of binding meats, which are wound in a bar shape, at a predetermined interval and covering upper and lower portions of the binding meats with a film and then packaging the covered binding meats by heat sealing.

In accordance with one aspect of the present invention, the method for manufacturing a bundle of crab sticks comprising a raw material thawing step, a mixing step, a meat transferring step, a molding and attaching step, a first preheating step, a postheating step, a cooling step, a slicing step, a binding step, and a cutting process comprises: between the binding step and the cutting step, a binding meat guide inputting step of inputting plural strings of binding meats onto a conveyor through a guide part; a film pigment mixing meat coating step of thinly coating a pigment mixing meat on upper and lower films by upper and lower pigment coating machines; a binding meat horizontal aligning step of horizontally aligning the binding meats, which are input between the upper and lower films thinly coated with the pigment mixing meat through the guide part and, at a predetermined interval while passing the binding meats through a guide concave groove of a press roller while being covered with the upper and lower films; and a film heat sealing step of peelably heat-sealing, by heat sealing rollers of heat sealing apparatus, the upper and lower films to outer sides of both ends in a transfer direction of the binding meat subjected to the binding meat horizontal aligning step at a predetermined width. The steps may be sequentially performed.

In the binding meat guide inputting step, the binding meat may be five to ten strings.

In the film pigment mixing meat coating step, a pigment mixing meat may be thinly coated on the upper and lower films of a portion to which the binding meat contacts at a predetermined width.

In the binding meat horizontal aligning step, the binding meat may be covered with the upper and lower films on which the pigment mixing meats are thinly coated and the bar shapes of the binding meats may be horizontally aligned at a predetermined interval while passing through a guide concave groove of a press roller and may be stuck on the films. That is, the pigment mixing meat thinly coated on the film may serve to stick the bar shapes of the binding meats on the film to fix the binding meats so as to prevent the binding meats from moving to each other.

The method may further comprise: a first preheating step of injecting steam onto the upper and lower films subjected to the film heat sealing step to convey the pigment mixing meat thinly coated by heat onto a surface of the binding meat.

In an apparatus for manufacturing a bundle of crab sticks comprising a thawing machine, a mixer, a meat transfer pump, a molding machine, a preheating machine, a slicing machine, a binding machine, a pigment coating machine, a wrapping machine, and a cutter, the apparatus for manufacturing a bundle of crab sticks according to the present invention comprises: a guide part configured to be provided on one side of a frame to input plural strings of binding meats wound in a bar shape by a binding machine onto a conveyor; upper and lower film winding bodies configured to be rotatably mounted at upper and lower portions of the frame to be wound with the upper and lower films, respectively, supplied to the conveyor to cover upper and lower portions of the bar shapes of the binding meats; upper and lower pigment coating machines configured to thinly coat a pigment mixing meat on the upper and lower films prior to supplying the upper and lower films onto the conveyor through the upper and lower film winding bodies; a press roller configured to horizontally align the bar shapes of the binding meats input between the upper and lower films on which the pigment mixing meats are thinly coated at a predetermined interval while passing through guide concave grooves provided in the number corresponding to the number of bar shapes of the binding meats and stick the binding meat to the film; and upper and lower heat sealing rollers of a heat sealing apparatus configured to peelably heat-seal the upper and lower films to outer sides of both ends in a transfer direction of the binding meat passing through the guide concave groove of the press roller at a predetermined width.

The apparatus may further comprise: upper and lower film auxiliary winding bodies configured to be wound with the upper and lower films, respectively, to be spaced from each other toward one side of the upper and lower film winding bodies.

The guide concave groove of the press roller may be provided five to ten at a predetermined interval.

The upper and lower films may be formed of a translucent high-density polyethylene (HDPE) film.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Hereinafter, a method and an apparatus for manufacturing according to the present invention will be described in detail with reference to an exemplary embodiment of the present invention.

Embodiments of the present invention may be changed in several other forms and the scope of the present invention is not limited to the following described embodiments.

Further, shapes of elements in the drawings may be exaggeratedly represented to emphasize the clearer description of the present invention, the same members in each drawing may be denoted by the same reference numerals, and a detailed description of the known functions and constitutions that may obscure the gist of the present invention will be omitted.

Figure 2:
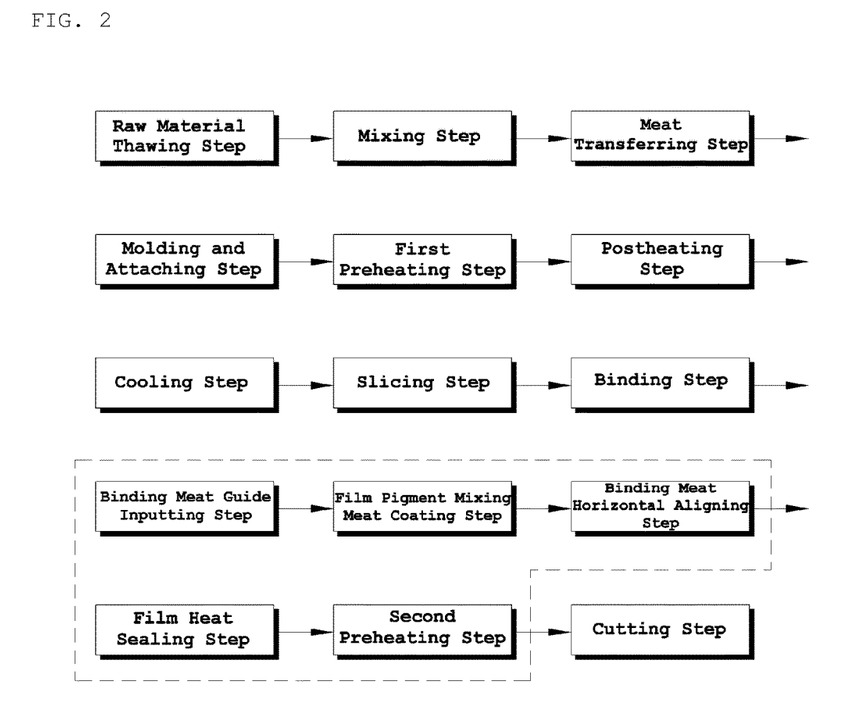
FIG. 2 is a diagram illustrating a process for manufacturing a bundle of crab sticks according to the present invention.
Figure 3:
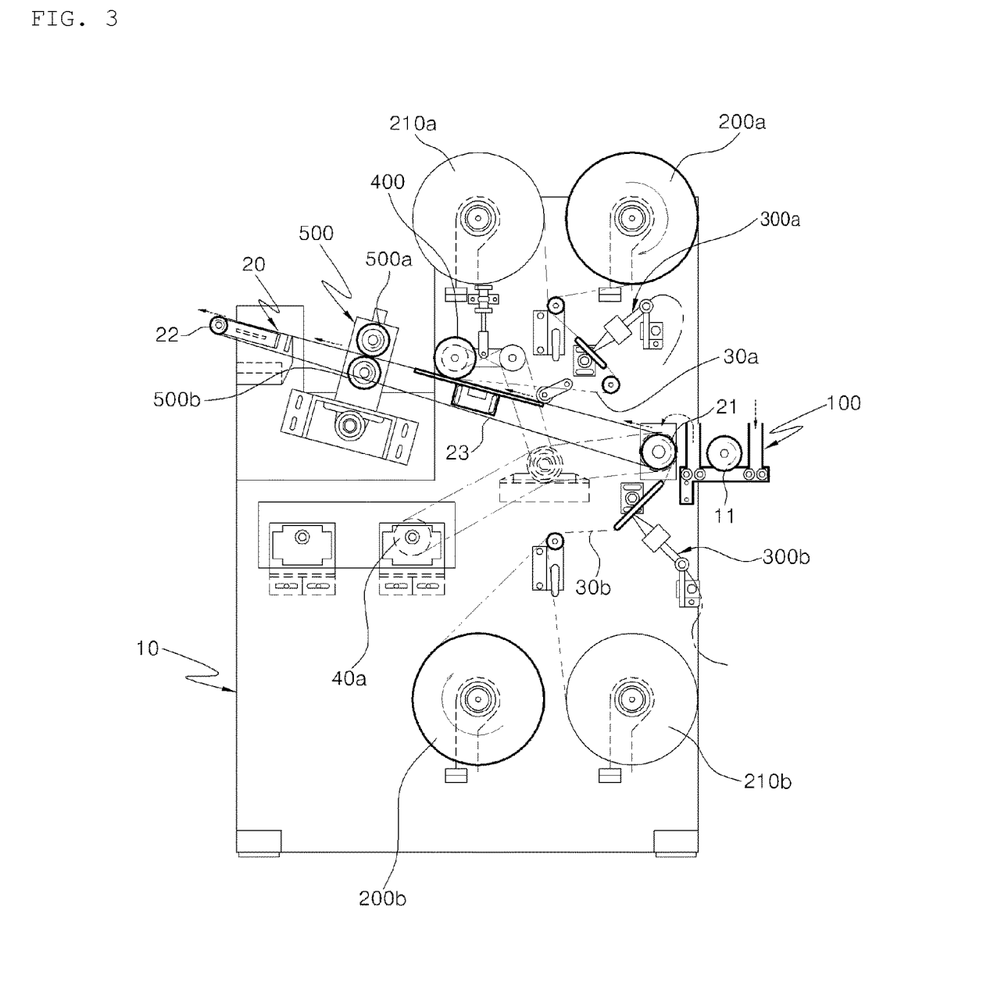
FIG. 3 is a front view schematically illustrating an apparatus for manufacturing a bundle of crab sticks according to the present invention.
Figure 4:
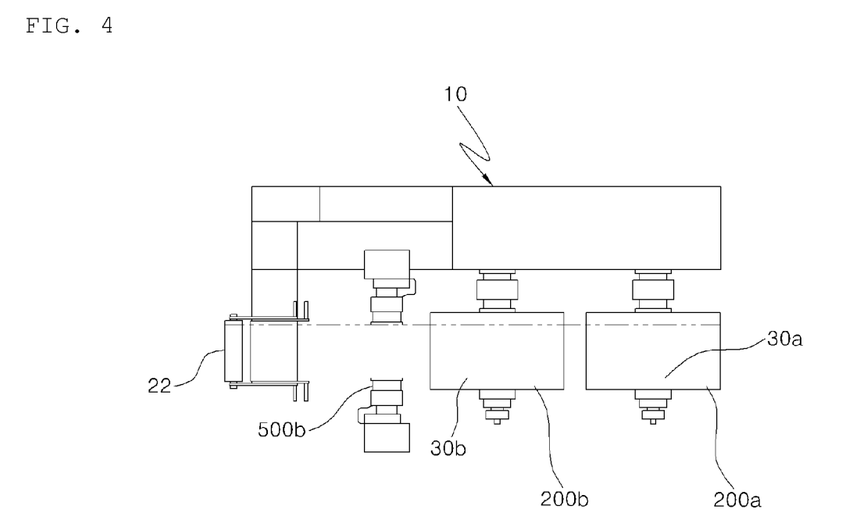
FIG. 4 is a plan view of main parts of FIG. 3.
Figure 5:
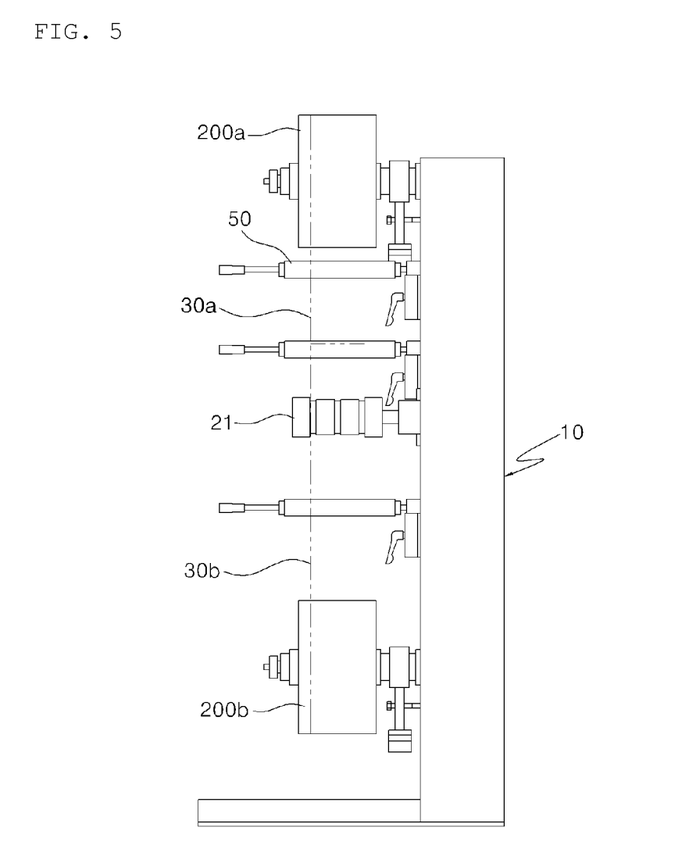
FIG. 5 is a right side view of the main parts of FIG. 3.
Figure 6:
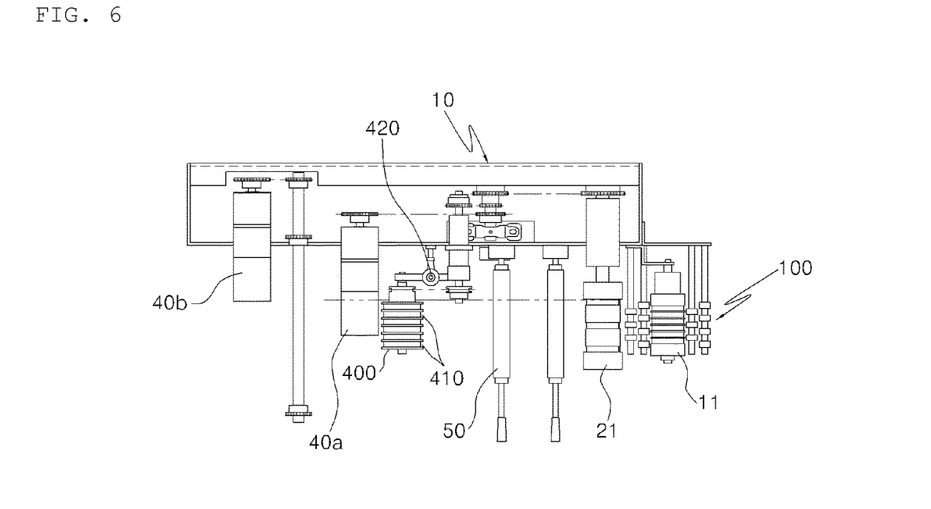
FIG. 6 is a plan view of a manufacturing apparatus for describing the input and the horizontal alignment state of the bar shapes of the binding meats at the time of manufacturing a bundle of crab sticks according to the present invention.
Figure 7:
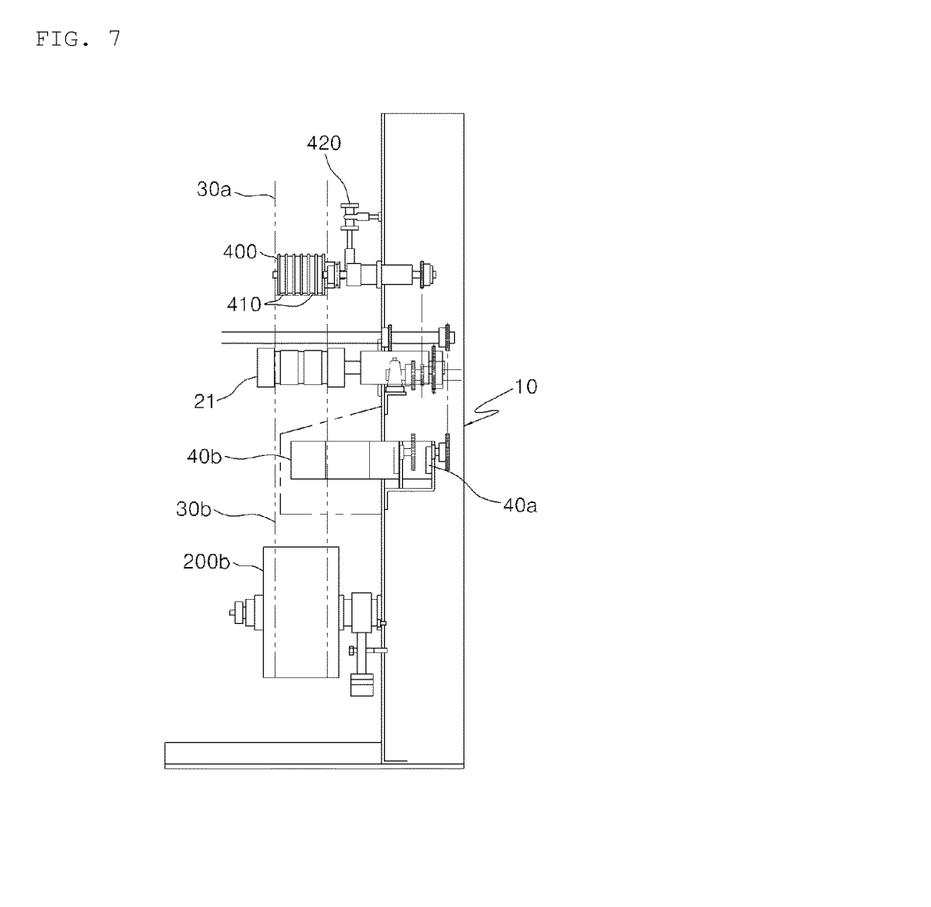
FIG. 7 is a right side view of the manufacturing apparatus for describing the input and the horizontal alignment state of the bar shapes of the binding meats at the time of manufacturing a bundle of crab sticks according to the present invention.
Figure 8:
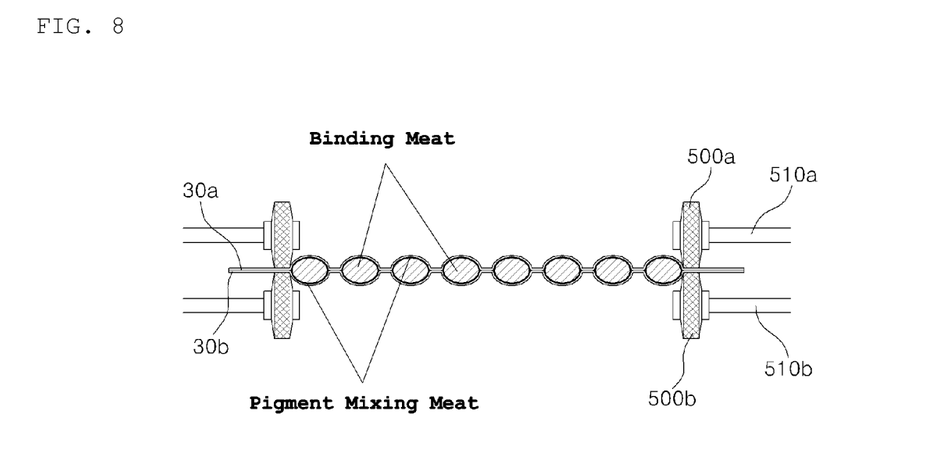
FIG. 8 is an exemplified diagram illustrating a state in which upper and lower films according to the present invention are heat-sealed by a heat sealing roller of the manufacturing apparatus.

FIG. 2 is a diagram illustrating a process for manufacturing a bundle of crab sticks according to the present invention, FIG. 3 is a front view schematically illustrating an apparatus for manufacturing a bundle of crab sticks according to the present invention, FIG. 4 is a plan view of main parts of FIG. 3, FIG. 5 is a right side view of the main parts of FIG. 3, FIG. 6 is a plan view of a manufacturing apparatus for describing an input and a horizontal alignment state of a bar shape of the binding meats at the time of manufacturing a bundle of crab sticks according to the present invention, FIG. 7 is a right side view of the manufacturing apparatus for describing the input and the horizontal alignment state of the bar shape of the binding meats at the time of manufacturing a bundle of crab sticks according to the present invention, and FIG. 8 is an exemplified diagram illustrating a state in which upper and lower films according to the present invention are heat-sealed by a heat sealing roller of the manufacturing apparatus.

As illustrated in FIGS. 2 to 9, the method for manufacturing a bundle of crab sticks of the present invention comprises a raw material thawing step, a mixing step, a meat transferring step, a molding and attaching step, a first preheating step, a postheating step, a cooling step, a slicing step, a binding step, and a cutting process, wherein the method includes: between the binding step and the cutting step, a binding meat guide inputting step of inputting plural strings of binding meats onto a conveyor (20) through a guide part (100); a film pigment mixing meat coating step of thinly coating a pigment mixing meat on upper and lower films (30a) (30b) by upper and lower pigment coating machines (300a) (300b); a binding meat horizontal aligning step of horizontally aligning the bar shapes of the binding meats, which are input between the upper and lower films (30a) (30b) thinly coated with the pigment mixing meat through the guide part (100) and, at a predetermined interval while passing the binding meats through a guide concave groove (410) of a press roller (400) while being covered with the upper and lower films (30a) (30b) and sticking the binding meats on the films; and a film heat sealing step of peelably heat-sealing the upper and lower films (30a) (30b) by heat sealing rollers (500a) (500b) of heat sealing apparatus (500) to outer sides of both ends in a transfer direction of the binding meats subjected to the binding meat horizontal aligning step at a predetermined width.

Further, the binding meat in the binding meat guide inputting step may be preferably input in five to ten strings. The reason is that when less than five strings of binding meats are input, workability and productivity are reduced and when more than ten strings of binding meats are input, the binding meats have trouble being horizontally aligned at a predetermined interval by passing through the guide concave groove (410) of the press roller (400). Therefore, the number of binding meats in the binding meat guide inputting step is limited to five to ten strings but the exemplary embodiment of the present invention is not necessarily limited thereto, and thus the number of strings of binding meats may be input while being increased and reduced, if necessary.

Further, the pigment mixing meat in the film pigment mixing meat coating step may be preferably thinly coated on the upper and lower films (30a) (30b) of a portion contacting the bar shapes of the binding meats at a predetermined width. The pigment mixing meat is thinly coated on the upper and lower films (30a) (30b) of the portion contacting the bar shapes of the binding meats at a predetermined width, thereby saving a coated amount of the pigment mixing meat and making an appearance of the upper and lower films (30a) (30b) other than the portion contacting the binding meat clear.

Further, in the binding meat horizontal aligning step, the press roller makes the bar shapes of the binding meats be horizontally aligned at a predetermined interval and sticks the bar shapes of the binding meats stick on the film. In this case, the upper and lower films (30a) (30b) between the bar shapes of the binding meats are compressed by the press roller (400) to adhere to each other in an adhering form to prevent the binding meats from moving and the pigment mixing meats thinly coated on the upper and lower films also serve to stick several strings of horizontally aligned bar shapes of the binding meats on the film to fix the binding meats so as to prevent the binding meats from moving to each other.

Further, the method for manufacturing a bundle of crab sticks may further comprise: a second preheating step of injecting, by a preheater (not illustrated), steam onto the upper and lower films (30a) (30b) subjected to the film heat sealing step to convey the pigment mixing meat thinly coated by heat onto a surface of the binding meat. This is to prevent the pigment mixing meat from being separated from a crab stick at the time of peeling off the upper and lower films (30a) (30b) to use the crab stick while easily conveying the pigment mixing meat onto the surface of the binding meat, thereby making a beautiful appearance, raising appetite, and raising commercial value.

As illustrated in FIGS. 3 to 9, the apparatus for manufacturing a bundle of crab sticks according to the present invention for the performance of the method for manufacturing a bundle of crab sticks comprises a thawing machine, a mixer, a meat transfer pump, a molding machine, a preheating machine, a slicing machine, a binding machine, a pigment coating machine, a wrapping machine, and a cutter, wherein the apparatus for manufacturing a bundle of crab sticks comprises: a guide part (100) configured to be provided on one side of a frame (10) to input plural strings of binding meats onto a conveyor (20); upper and lower film winding bodies (200a) (200b) configured to be rotatably mounted at upper and lower portions of the frame (10) to be wound with the upper and lower films (30a) (30b), respectively, supplied to the conveyor (20) to cover upper and lower portions of the binding meat; upper and lower pigment coating machines (300a) (300b) configured to thinly coat a pigment mixing meat on the upper and lower films (30a) (30b) prior to supplying the upper and lower films (30a) (30b) onto the conveyor (20) through the upper and lower film winding bodies (200a) (200b); a press roller (400) configured to horizontally align the bar shapes of the binding meats input between the upper and lower films (30a) (30b) on which the pigment mixing meats are thinly coated at a predetermined interval while passing through guide concave grooves (410) provided to correspond to the number of bar shapes of the binding meats and stick the binding meat to the film; and upper and lower heat sealing rollers (500a) (500b) of a heat sealing apparatus (500) configured to peelably heat-seal the upper and lower films (30a) (30b) to outer sides of both ends in a transfer direction of the binding meat passing through the guide concave groove (410) of the press roller (400) at a predetermined width.

In this configuration, the conveyor (20) is installed to be inclined upward from the guide part (100) and connect between a driving roller (21) and a front end roller (22) by a conveyor belt (23) to rotate counterclockwise by a driving of a first driving motor (40a).

Further, the apparatus for manufacturing a bundle of crab sticks is configured to further comprise upper and lower auxiliary winding bodies (210a) (210b) around which the upper and lower films (30a) (30b) are each wound so as to be spaced from each other toward one side of the upper and lower film winding bodies (200a) (200b), in addition to the upper and lower film winding bodies (200a) (200b). This is to continuously supply the upper and lower films (30a) (30b) when the upper and lower films (30a) (30b) wound around the upper and lower film winding bodies (200a) (200b) are each vanished.

Further, the guide concave groove (410) of the press roller (400) may be preferably formed five to ten at a predetermined interval. The guide concave groove (410) is provided in a number corresponding to the number of bar shapes of the binding meats input through the guide part (100) but is not limited thereto, and therefore the number of guide concave grooves (410) may be increased and reduced depending on the number of bar shapes of the binding meats input through the guide part (100).

Further, the upper and lower films (30a) (30b) may be preferably formed of a translucent high-density polyethylene (HDPE) film. The high-density polyethylene film is safe even at the time of contacting food and has excellent chemical safety, heat resistance, and touch nature and, therefore, has been widely used as an inner film for packaging a bundle of crab sticks for quickly peeling off the heat-sealed film despite disadvantages such as poor transparency and week heat sealability. However, the upper and lower films (30*a*) (30*b*) are not necessarily formed of the high-density polyethylene film and have similar physical properties to those of the high-density polyethylene film and thus may be replaced with a film of a material which may be simply substituted.

Further, the upper and lower heat sealing rollers (500*a*) (500*b*) of the heat sealing apparatus (500) contact each other while generating heat due to an electric heater (not illustrated) configured in heating shafts (510*a*) (510*b*) and are thus formed with an embossing pattern (see FIG. 8) to rotate in an opposite direction from each other by the driving of the motor (not illustrated), the upper and lower heat sealing rollers (500*a*) (500*b*) may be configured to control an interval between the heat sealing rollers at both sides of the upper and lower heat sealing rollers (500*a*) (500*b*) to perform heat sealing depending on the number of bar shapes of the binding meats from the heating shafts (510*a*) (510*b*) (for example, the heating shafts are formed in a bolt, and the plurality of heat sealing rollers are formed with a nut to control the interval between the heat sealing rollers at both sides in a screw manner or the heat sealing rollers are slidably inserted from the heating shaft to control the interval between the heat sealing rollers in a sliding manner and then is fixed to the heating shaft by a fixing means such as a bolt, and the like).

In the drawings, non-explained reference numeral 40*b* is a second driving motor and non-explained reference numeral 50 is a free roller for controlling tension of a film.

As described above, a method for manufacturing a bundle of crab sticks using the manufacturing apparatus which is suitable for the method for manufacturing a bundle of crab sticks according to the present invention will be described in more detail.

The method for manufacturing a bundle of crab sticks comprises: a thawing step of thawing a frozen (no more than −18° C.) raw material to make a temperature of a central portion of the frozen raw material reach about −3° C. so as to make the frozen raw material be in a suitable state for a subsequent mixing step; a mixing step of mixing auxiliary materials in a mixer, while mixing raw materials to which the thawed raw material and various kinds of auxiliary raw materials are added; a meat transferring step of transferring a mixed meat to a subsequent molding step by a transfer pump; a molding and attaching step of peeling off, molding, and attaching the transferred mixed meat in a plate shape to have a predetermined thickness and width (preferably, a thickness of 1.2 mm and a width of 63 mm) on a belt of a steel material by a molding nozzle of a molding machine; a first preheating step of injecting steam into the peeled off and molded meat attached on the belt of the steel material and protein molding the peeled off and molded meat by heat; a postheating step of adjusting moisture of a surface of the preheated peeled off and molded meat to proper moisture by heat from a gas burner; a cooling step of cooling the peeled off meat, which is heated by steam and gas, by cooling or forced ventilation; a slicing step of slicing the cooled peeled off meat as a crab's leg flesh at an interval of about 1 mm by a slicing machine; a binding step of rolling and binding the sliced peeled off meat in a bar shape by a binding machine; and a cutting step of cutting a pigment coating binding meat wrapped and sealed with the film at a predetermined length by a cutter. The manufacturing method is the related art and thus the detailed description thereof will be omitted.

The method for manufacturing a bundle of crab sticks according to the present invention comprises: between the binding step and the cutting step according to the related art, inputting plural strings of binding meats, preferably, five to ten bar shapes of the binding meats passing through the binding step, horizontally aligning the bar shapes of the binding meats passing between the upper and lower films (30*a*) (30*b*) on which the pigment mixing meats are thinly coated at a predetermined interval, and heat-sealing the upper and lower films and then preheating the upper and lower films, in which the plural strings of binding meats are continuously input through the guide part (100) and the binding meat input to the guide part (100) is input between the upper and lower films (30*a*) (30*b*), respectively, supplied onto the conveyor (20) from the upper and lower film winding bodies (200*a*) (200*b*) by a rotation of a transfer roller (11) and is transferred (binding meat guide inputting step). In this case, the upper and lower films (30*a*) (30*b*) are formed of the translucent high-density polyethylene (HDPE) film used as the general inner film wrapping paper for a crab stick, and the upper and lower pigment coating machines (300*a*) (300*b*) thinly coat the pigment mixing meat on a portion contacting the binding meat at a predetermined width prior to being supplied onto the conveyor (20).

The plural strings of binding meats transferred between the upper and lower films (30*a*) (30*b*) are covered with the upper and lower films (30*a*) (30*b*) and are horizontally aligned at a predetermined interval while passing through the guide concave grooves (410) of the press roller (400) of which the height may be controlled vertically by a rod end (420) (binding meat horizontal aligning step). That is, the plural strings of binding meats are guided and inserted into the guide concave grooves (410) by the rotation of the press roller (400) and the binding meats inserted into the guide concave grooves (410) are wound together into two or more bar shapes, and each bar shape passes through a different concave groove, and transferred while being horizontally aligned at a predetermined interval, while the binding meats are compressed and passed. In this case, the upper and lower films (30*a*) (30*b*) between the binding meats adhere to each other in an adhering form to prevent the binding meats from moving.

Figure 9:
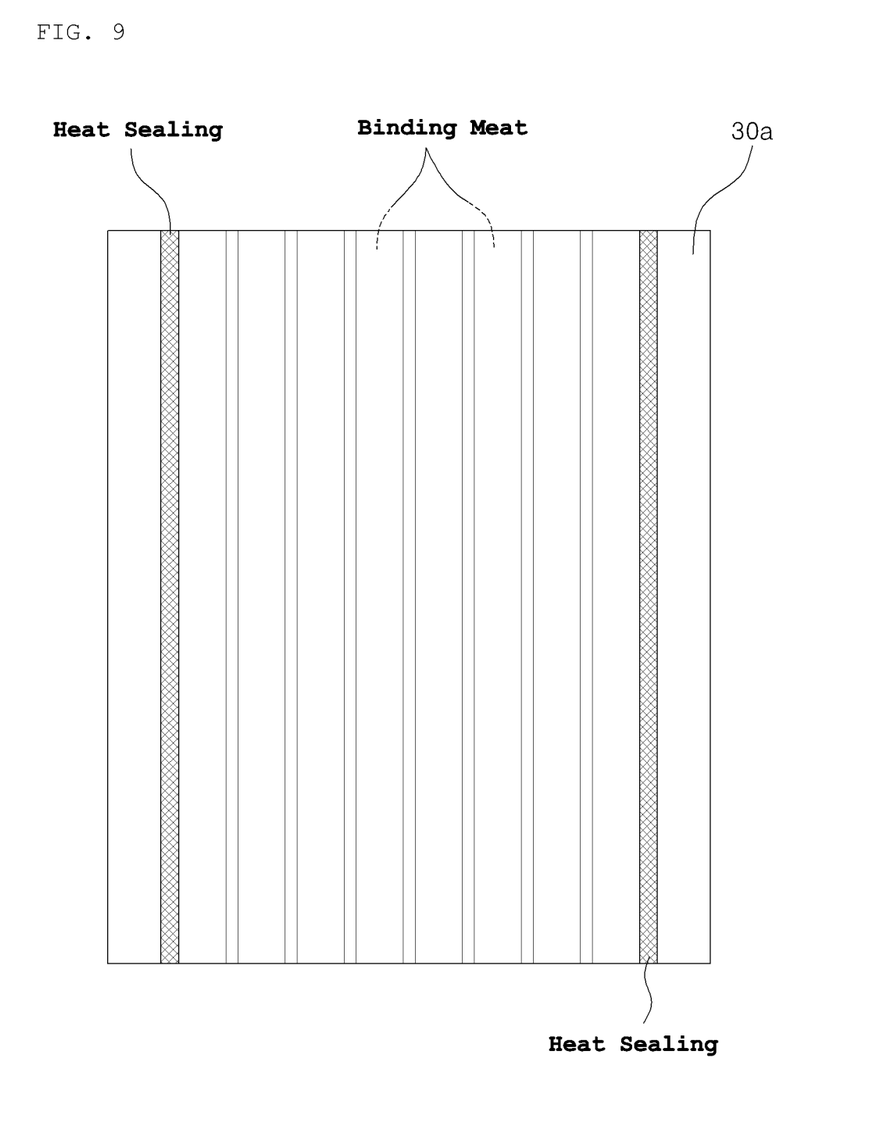
FIG. 9 is a diagram illustrating a form in which a bundle of crab sticks is packaged, according to an exemplary embodiment of the present invention.
Figure 10:
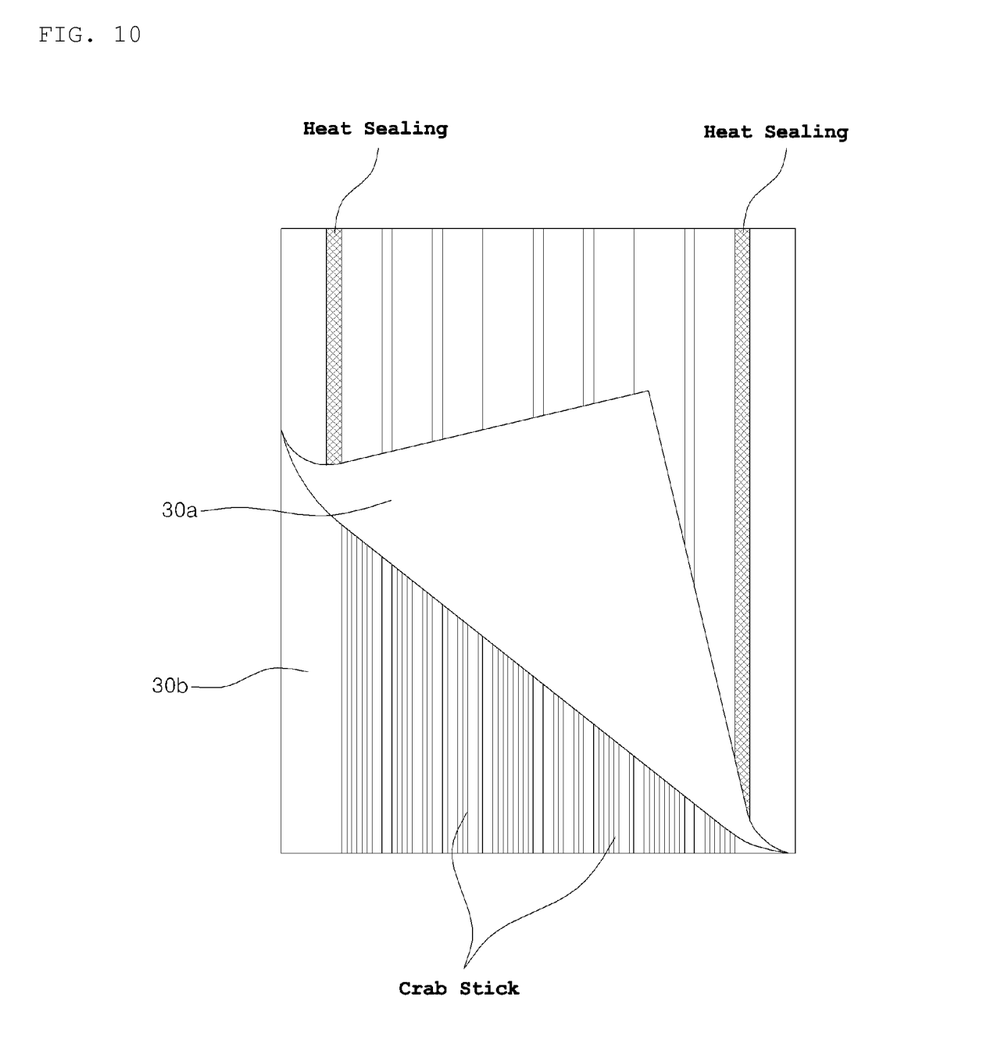
FIG. 10 is a diagram illustrating a peeling state of a film with which a bundle of crab sticks is packaged, according to an exemplary embodiment of the present invention.

As described above, the bar shapes of the binding meats covered with the upper and lower films (30*a*) (30*b*) and transferred while being horizontally aligned at a predetermined interval are transferred between the upper and lower heat sealing rollers (500*a*) (500*b*) of the heat sealing apparatus (500) and thus are peelably heat-sealed at a predetermined width as illustrated in FIGS. 8 and 9 when the upper and lower films (30*a*) (30*b*), for example, eight bar shapes of the binding meats are injected into the outer sides of both ends in the transfer direction of the binding meats through the guide part (100) (film heat sealing step). In this case, the remaining portion other than the heat sealing portion on both sides in the transfer direction of the upper and lower films (30*a*) (30*b*) are not heat-sealed at a predetermined width and thus the upper and lower films may be quickly peeled off when the upper and lower films (30*a*) (30*b*) subjected to the cutting process are peeled off (see FIG. 10) to use a crab stick.

Afterward, the preheater (not illustrated) injects steam into the upper and lower films (30*a*) (30*b*) subjected to the film heat sealing step to transfer the pigment mixing meat thinly applied by heat to the surface of the bar shapes of the binding meat (first preheating step) and then the pigment coating bar shape of the binding meats accumulated while being covered with the upper and lower films (30*a*) (30*b*) is cut at a predetermined length by a cutter (not illustrated), thereby manufacturing a bundle of crab sticks.

As described above, although not illustrated, the crab stick subjected to the cutting step is mounted in a moving truck while being comprised in a tray, and the moving truck with the tray in which the crab stick is comprised is sterilized in a steam box and then frozen, and thus plural sheets of crab sticks are stacked by a food package film and are packaged.

According to the method and apparatus for manufacturing a bundle of crab sticks in accordance with the exemplary embodiments of the present invention, crab sticks, preferably, five to ten crab sticks may be packaged within a single upper and lower film, and as a result, it is possible to easily peel off the upper and lower films to use the crab stick, and crab sticks may be simultaneously used at a time only by removing the upper and lower films, and as a result, it is possible to improve the operation efficiency of businesses such as food service facilities, gimbap chain stores, and food factories which consume a huge amount of crab sticks so as to save costs, and it is possible to more remarkably reduce the use of waste film than the use of waste film according to the related art which wraps and packages each of the crab sticks by one sheet of inner film so as to reduce the risk of environmental pollution.

Although the exemplary embodiments of the present invention have been disclosed with reference to the accompanying drawings, the present invention is not limited thereto but may be changed and modified in various forms by a person skilled in the art to which the present invention pertains within the technical scope of the present invention and the equivalent scope to the claims to be described below.

What is claimed is:

1. A method for manufacturing a bundle of crab sticks comprising: inputting a plurality of strings of binding meats into a guide having two or more concave grooves, wherein the plurality of strings of binding meats are wound together into two or more bar shapes, and wherein each bar shape passes through a different concave groove; coating, using one or more pigment coating machines, an upper film and a lower film with a pigment, contacting the two or more bar shapes with the upper film and the lower film while passing the bar shapes through the guide; sealing, using one or more rollers, at least a portion of the upper film and the lower film together; and injecting steam onto the upper film and the lower film thereby adhering the pigment onto an outer surface of the two or more bar shapes, such that when the upper film and lower film are peeled apart, the pigment and the two or more bar shapes remain together.

2. The method for manufacturing a bundle of crab sticks according to claim 1, wherein the plurality of strings of binding meat are wound together into five to ten bar shapes.

3. The method for manufacturing a bundle of crab sticks according to claim 1, characterized in that the pigment is thinly coated with a predetermined interval to the upper film and the lower film at the position where the upper film or the lower film is in contact with each bar shape.

* * * * *